United States Patent
Kim

(10) Patent No.: US 11,618,447 B2
(45) Date of Patent: Apr. 4, 2023

(54) SUDDEN ACCELERATION PREVENTION METHOD AND VEHICLE USING THE SAME

(71) Applicants: Hyundai Motor Company, Seoul (KR); Kia Motors Corporation, Seoul (KR)

(72) Inventor: Eun Sik Kim, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 205 days.

(21) Appl. No.: 17/095,087

(22) Filed: Nov. 11, 2020

(65) Prior Publication Data

US 2021/0362715 A1 Nov. 25, 2021

(30) Foreign Application Priority Data

May 22, 2020 (KR) .................. 10-2020-0061784

(51) Int. Cl.
*B60W 30/14* (2006.01)
*B60W 50/00* (2006.01)
(Continued)

(52) U.S. Cl.
CPC ........ *B60W 30/146* (2013.01); *B60W 40/076* (2013.01); *B60W 40/08* (2013.01);
(Continued)

(58) Field of Classification Search
CPC .......... B60W 50/0097; B60W 50/087; B60W 30/146; B60W 30/188; B60W 2552/05;
(Continued)

(56) References Cited

U.S. PATENT DOCUMENTS 9,120,375 B2 * 9/2015 Byun ................ F02D 11/107
10,023,189 B2 * 7/2018 Ko .................... B60K 28/14
(Continued)

FOREIGN PATENT DOCUMENTS

DE  10316446 B4 *  6/2021  ........... B60W 10/02
EP  1382477 A1 *  1/2004  ........... B60K 31/047
(Continued)

OTHER PUBLICATIONS

Okuyama, et al.; Model predictive control-based drive assist control in Electric vehicle—An application to inter distance control considering human model; Nov. 2012; 2012 Congress on Mechatronics (Mecatronics); pp. 158-160 (https://ieeexplore.ieee.org/document/6451002) (Year: 2012).*

(Continued)

*Primary Examiner* — Atul Trivedi
(74) *Attorney, Agent, or Firm* — Fox Rothschild LLP

(57) ABSTRACT

A sudden acceleration prevention method for a vehicle includes the following steps, which may be performed by a controller: monitoring an output signal of an accelerator pedal sensor so as to obtain a detected operation state of an accelerator pedal, determining whether the detected operation state of the accelerator pedal is within a predetermined brake pedal operation range, determining whether the detected operation state of the accelerator pedal is within a predetermined accelerator pedal and brake pedal overlapping operation range if the detected operation state of the accelerator pedal is within the predetermined brake pedal operation range, and outputting an output reduction control signal of the vehicle if the detected operation state of the accelerator pedal is not within the accelerator pedal and brake pedal overlapping operation range.

20 Claims, 4 Drawing Sheets

(51) Int. Cl.
  *B60W 40/08* (2012.01)
  *B60W 50/08* (2020.01)
  *B60W 40/076* (2012.01)

(52) U.S. Cl.
  CPC ...... *B60W 50/0097* (2013.01); *B60W 50/087* (2013.01); *B60W 2520/10* (2013.01); *B60W 2540/10* (2013.01); *B60W 2540/12* (2013.01); *B60W 2552/05* (2020.02); *B60W 2552/15* (2020.02)

(58) Field of Classification Search
  CPC ..... B60W 2552/15; B60W 2510/0657; B60W 2510/083; B60W 2540/10; B60W 2540/12; B60W 40/076; B60W 40/08; B60W 2520/10; B60K 28/00
  USPC .......................................................... 701/93
  See application file for complete search history.

(56) References Cited

U.S. PATENT DOCUMENTS

| | | | | |
|---|---|---|---|---|
| 2006/0064225 | A1* | 3/2006 | Tabata | B60W 10/115 701/55 |
| 2007/0142169 | A1* | 6/2007 | Marcil | B60K 28/06 477/107 |
| 2010/0100278 | A1* | 4/2010 | Saito | B60T 7/12 701/29.2 |
| 2013/0296130 | A1* | 11/2013 | Banker | B60L 7/26 477/209 |
| 2018/0188744 | A1* | 7/2018 | Switkes | G05D 1/0088 |
| 2020/0090426 | A1* | 3/2020 | Barnes | G06N 5/003 |
| 2020/0148208 | A1* | 5/2020 | Choi | B60W 10/196 |
| 2021/0171030 | A1* | 6/2021 | Lee | H04W 4/40 |
| 2021/0171038 | A1* | 6/2021 | Lee | H04W 4/023 |

FOREIGN PATENT DOCUMENTS

| | | | | |
|---|---|---|---|---|
| KR | 100288354 | B1 | * | 4/2001 |
| KR | 100325546 | B1 | * | 3/2002 |
| KR | 20050039356 | A | * | 4/2005 |
| KR | 20120058250 | A | * | 6/2012 |
| KR | 20130011076 | A | * | 1/2013 |
| KR | 101407998 | B1 | * | 6/2014 |
| KR | 101619294 | B1 | * | 5/2016 |
| KR | 102080272 | B1 | * | 2/2020 |
| KR | 20210088410 | A | * | 7/2021 |
| WO | WO-2015016326 | A1 | * | 2/2015 ............... B60T 7/12 |

OTHER PUBLICATIONS

Caliskan, et al.; Efficacy of Haptic Pedal Feel Compensation on Driving with Regenerative Braking; Dec. 2019; IEEE Transactions on Haptics; pp. 1-4 (https://arxiv.org/abs/1910.02440) (Year: 2019).*

Jinfang, et al.; The coordinated control of motor regenerative braking torques defined by accelerator pedal and brake pedal of electric vehicle; 2012 IEEE Vehicle Power and Propulsion Conference, Oct. 9-12, 2012, Seoul, Korea (https://ieeexplore.ieee.org/document/6422563) (Year: 2012).*

* cited by examiner

SUDDEN ACCELERATION PREVENTION METHOD AND VEHICLE USING THE SAME

CROSS-REFERENCE TO RELATED APPLICATION

This application claims under 35 U.S.C. § 119 the benefit of Korean Patent Application No. 10-2020-0061784 filed in the Korean Intellectual Property Office on May 22, 2020, the entire contents of which are incorporated herein by reference.

BACKGROUND

(a) Technical Field

The present disclosure relates to a sudden acceleration prevention method and a vehicle using the same, more particularly, to the sudden acceleration prevention method and the vehicle in which sudden acceleration due to incorrect operation of an accelerator pedal can be prevented.

(b) Description of the Related Art

In view of recent accidents caused by operator error in mistaking an accelerator pedal for a brake pedal in a vehicle, technology is being developed to prevent in accident in such a situation.

A sudden acceleration prevention system is a system that may prevent sudden acceleration of the vehicle by controlling idle torque during sudden operation of the accelerator pedal. However, there is a problem in that sudden acceleration typically cannot be prevented in the case of pedal mis-operation (incorrect operation) when a vehicle is traveling at a certain speed, because conventional rapid acceleration prevention technology has the effect of preventing rapid acceleration only from a stop or at low forward/reverse speeds.

In addition, when the accelerator pedal is operated suddenly at a merge point of a highway or on a steep slope, vehicle speed may be greatly reduced due to the control of idle torque, which itself may cause an accident.

In addition, since pedal operation habits are different for each driver, idle torque control during sudden operation of the accelerator pedal may cause an accident even for a driver who frequently performs the sudden operation.

The above information disclosed in this Background section is only for enhancement of understanding of the background of the disclosure, and therefore it may contain information that does not form the prior art that is already known in this country to a person of ordinary skill in the art.

SUMMARY

The present disclosure provides a sudden acceleration prevention method and a vehicle using the same may prevent sudden acceleration of the vehicle by performing idle torque control during sudden operation of an accelerator pedal only when it is determined that the pedal is mis-operated and may secure power performance of the vehicle by applying learning control logic.

A sudden acceleration prevention method for a vehicle according to an exemplary embodiment of the present disclosure may include monitoring, by a controller, an output signal of an accelerator pedal sensor so as to obtain a detected operation state of an accelerator pedal, determining by, the controller, whether the detected operation state of the accelerator pedal is within a predetermined brake pedal operation range, determining, by the controller, whether the detected operation state of the accelerator pedal is within a predetermined accelerator pedal and brake pedal overlapping operation range if the detected operation state of the accelerator pedal is within the predetermined brake pedal operation range, and outputting, by the controller, an output reduction control signal of the vehicle if the detected operation state of the accelerator pedal is not within the accelerator pedal and brake pedal overlapping operation range.

The sudden acceleration prevention method for a vehicle according to an exemplary embodiment of the present disclosure may further include detecting a current vehicle speed and outputting a corresponding signal by the vehicle speed sensor and determining, by the controller, whether the current vehicle speed is less than a predetermined first reference vehicle speed if the detected accelerator pedal operation status is within the predetermined accelerator pedal and brake pedal overlapping operation range, and outputting, by the controller, the output reduction control signal of the vehicle if the current vehicle speed is less than the first reference vehicle speed.

The sudden acceleration prevention method for a vehicle according to an exemplary embodiment of the present disclosure may further include determining, by the controller, whether the current vehicle speed is less than a predetermined second reference vehicle speed if the current vehicle speed is not less than the first reference vehicle speed, and outputting, the controller, an output control signal of the vehicle according to the output signal of the accelerator pedal sensor if the current vehicle speed is less than the second reference vehicle speed.

The output of the vehicle may be limited to less than the second standard vehicle speed.

The controller may limit the output of the vehicle to the second reference vehicle speed if the current vehicle speed is not less than the second reference vehicle speed.

The predetermined brake pedal operation range and the predetermined accelerator pedal and brake pedal overlapping operation range may be experimentally determined and stored in advance in memory (e.g., in a map).

The predetermined brake pedal operation range and the predetermined accelerator pedal and brake pedal overlapping operation range may be stored ranges according to an operation rate and an operation depth of the accelerator pedal and brake pedal of the driver.

The predetermined brake pedal operation range and the predetermined accelerator pedal and brake pedal overlapping operation range correspond to a frequency of use of the accelerator pedal and the brake pedal, and store the operation state above the predetermined frequency of use.

The sudden acceleration prevention method may further include measuring the position of the vehicle, wherein if the current vehicle position falls within a predetermined sudden acceleration prevention area, the controller outputs the vehicle's output control signal according to the output signal of the accelerator pedal sensor.

The sudden acceleration prevention area may include at least one of a highway or an uphill road.

The sudden acceleration prevention method may further include determining whether the sudden acceleration prevention mode switch is operated, wherein if the sudden acceleration prevention mode switch is on, the operation to prevent sudden acceleration of the vehicle is performed.

The sudden acceleration prevention method may further include measuring a road slope, wherein if the current vehicle's driving road is uphill, the controller outputs the vehicle's output control signal according to the output signal of the accelerator pedal sensor.

The sudden acceleration prevention method may further include outputting, by the controller, an output control signal of the vehicle according to the output signal of the accelerator pedal sensor when the detected operation state of the accelerator pedal is not within the brake pedal operation range.

A vehicle of which an acceleration prevention method is applied, the vehicle according to an exemplary embodiment of the present disclosure may include a vehicle operating condition measuring unit including an accelerator pedal sensor, a brake pedal sensor and a vehicle speed sensor, an output portion that drives the vehicle, and a controller that controls the operation of the output portion according to the output signal of the vehicle operating condition measuring unit, wherein the accelerator pedal sensor detects the operation of the accelerator pedal and outputs the corresponding signal, the controller determines whether the detected accelerator pedal operation state is within a predetermined brake pedal operation range, if the detected accelerator pedal operation state is within the predetermined brake pedal operation range, the controller determines whether the detected accelerator pedal operation state is within a predetermined accelerator pedal and brake pedal overlapping operation range, if the detected operation of the accelerator pedal is not within the predetermined accelerator pedal and brake pedal overlapping operation range, the controller outputs a vehicle's output reduction control signal to limit the operation of the output portion, and if the detected accelerator pedal operation status is not within the brake pedal operation range, the controller controls the operation of the output portion according to the output signal of the accelerator pedal sensor.

If the detected operation state of the accelerator pedal is within the predetermined accelerator pedal and brake pedal overlapping operation range, the controller may determine whether the current vehicle speed is less than a predetermined first reference vehicle speed, if the current vehicle speed is less than the first reference vehicle speed, the controller may output a control signal for reducing the output of the vehicle to limit the operation of the output portion, if the current vehicle speed is not less than the first reference vehicle speed, the controller may determine whether the current vehicle speed is less than a predetermined second reference vehicle speed, and if the current vehicle speed is less than the second reference vehicle speed, the controller may control the operation of the output portion according to the output signal of the accelerator pedal sensor, and if the current vehicle speed is not less than the second reference vehicle speed, the controller may control the operation of the output portion to limit the vehicle speed to the second reference vehicle speed.

The predetermined brake pedal operation range and the predetermined accelerator pedal and brake pedal overlapping operation range may be stored ranges according to an operation rate and an operation depth of the accelerator pedal and a brake pedal of the driver.

The predetermined brake pedal operation range and the predetermined accelerator pedal and brake pedal overlapping operation range may correspond to a frequency of use of the accelerator pedal and the brake pedal, and store the operation state above the predetermined frequency of use.

The vehicle of claim may further include a navigation system that measures a position of the vehicle and outputs the position, wherein if the current vehicle position corresponds to a predetermined sudden acceleration prevention area in advance, the controller controls the operation of the output portion according to the output signal of the accelerator pedal sensor.

The sudden acceleration prevention area may include at least one of a highway or an uphill road.

According to the sudden acceleration prevention method of the vehicle according to an exemplary embodiment of the present disclosure and the vehicle to which it is applied, the learning control logic is applied to the controller to perform idle torque control during sudden operation of the accelerator pedal only when it is determined to be pedal misoperation.

Accordingly, according to the sudden acceleration prevention method of the vehicle according to an exemplary embodiment of the present disclosure and the vehicle to which it is applied, it is possible to prevent sudden acceleration of the vehicle and secure the power performance of the vehicle.

According to the sudden acceleration prevention method of the vehicle according to an exemplary embodiment of the present disclosure and the vehicle to which it is applied, it is possible to prevent vehicle accidents by controlling the output according to the amount of operation of the accelerator pedal on a highway and uphill road.

DETAILED DESCRIPTION OF THE EMBODIMENTS

Figure 1:
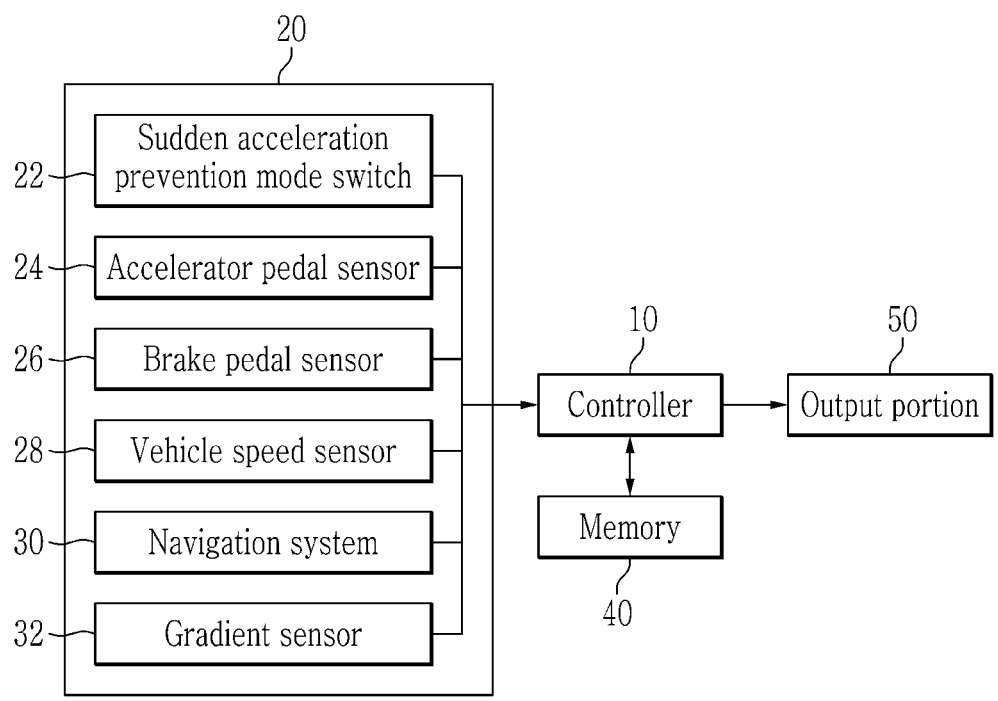
FIG. 1 is a block diagram of a vehicle to which a sudden acceleration prevention method of a vehicle according to an exemplary embodiment of the present disclosure is applied.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

In the following detailed description, only certain exemplary embodiments of the present disclosure have been shown and described, simply by way of illustration.

As those skilled in the art would realize, the described embodiments may be modified in various different ways, all without departing from the spirit or scope of the present disclosure.

Parts marked with the same reference number throughout the specification mean the same constituent elements.

An exemplary embodiment of the present disclosure will hereinafter be described in detail with reference to the accompanying drawings.

FIG. 1 is a block diagram of a vehicle to which a sudden acceleration prevention method of a vehicle according to an exemplary embodiment of the present disclosure is applied.

Referring to FIG. 1, a vehicle of which a sudden acceleration prevention method according to an exemplary embodiment of the present disclosure is applied may include a vehicle operating condition measuring unit 20 including an accelerator pedal sensor 24, a brake pedal sensor 26, and a vehicle speed sensor 28, and an output portion 50 that drives the vehicle, and a controller 10 that controls operation of the output portion 50 according to an output signal of the vehicle operating condition measuring unit 20.

The controller 10 may be hardware including at least one microprocessor (e.g., an ECU (Engine Control Unit or Electronic Control Unit)) or the microprocessor operated by a predetermined program, and the predetermined program may include a series of commands for performing the sudden acceleration prevention method according to an exemplary embodiment of the present disclosure. The instruction can be stored in memory 40.

The vehicle operating condition measuring unit 20 may further include a sudden acceleration prevention mode switch 22, which outputs a signal as to whether the vehicle's sudden acceleration prevention method is implemented in an exemplary embodiment of the present disclosure.

In addition, the vehicle operating condition measuring unit 20 may further include, for example, a navigation system 30 that measures a position of the vehicle and outputs a corresponding signal. The navigation system 30 may include a Global Positioning System (GPS).

In addition, the vehicle operating condition measuring unit 20 may further include, for example, a gradient sensor 32 that measures a road slope and outputs a corresponding signal. The gradient sensor 32 may be, for example, a sensor that measures a vehicle slope and outputs a corresponding signal.

Vehicles to which the sudden acceleration prevention method of a vehicle according to an exemplary embodiment of the present disclosure is applied include hybrid vehicles (HEVs) and electric vehicles (EVs). In addition, the vehicle may be a fuel cell vehicle (FCV), and the brake pedal sensor 26 may be a stroke sensor of a brake pedal.

Figure 2:
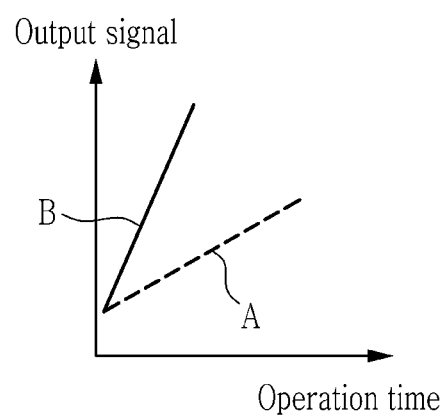
FIG. 2 is a graph showing pedal operation time and output signal of a vehicle to which a sudden acceleration prevention method of a vehicle according to an exemplary embodiment of the present disclosure is applied.

FIG. 2 is a graph showing pedal operation time and output signal of a vehicle to which a sudden acceleration prevention method of a vehicle according to an exemplary embodiment of the present disclosure is applied.

The sudden acceleration prevention method of a vehicle according to an exemplary embodiment of the present disclosure may include a process of learning the operation of an accelerator pedal and a brake pedal of a driver.

Since a habit of operating a pedal is different for each driver, a sensor signal learning logic may be required for the sudden acceleration prevention method of a vehicle according to an exemplary embodiment of the present disclosure.

As shown in FIG. 2, the driver's pedal operation habits can be learned through a pedal operation time and an output signal of the driver's accelerator pedal and brake pedal. That is, according to the operation rate and operation depth of the accelerator pedal and brake pedal, the driver's pedal operation habit can be learned. For example, a signal with a gentle slope, such as the "A" line, can be interpreted as a normal operation signal, and a signal with a steep slope, such as the "B" line, can be interpreted as an abrupt operation signal, and a slope or sensor value above a specific value may be judged as mis-operation (or incorrect operation).

Figure 3:
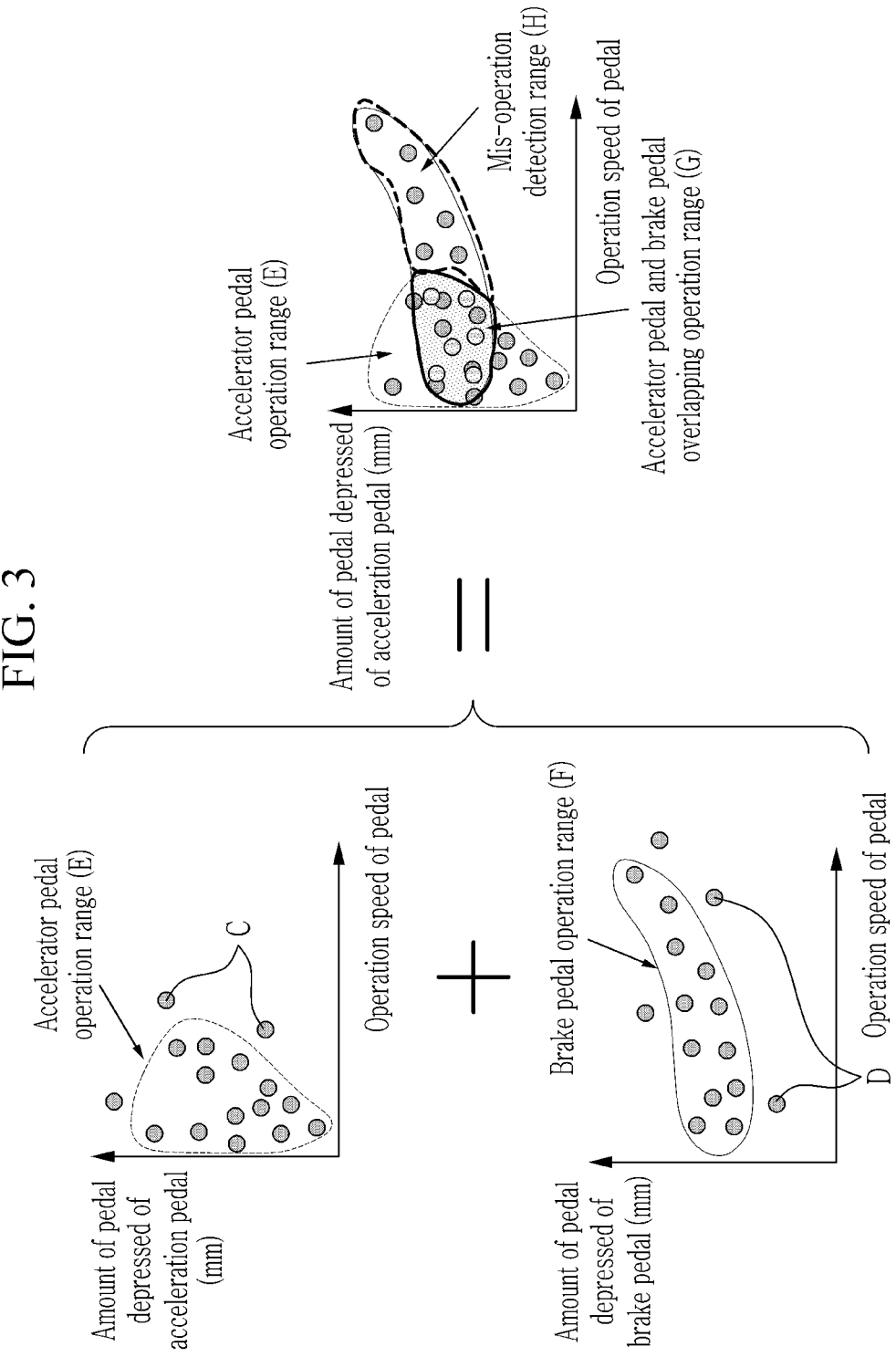
FIG. 3 is a drawing showing a learning method of a vehicle applying a sudden acceleration prevention method of a vehicle according to an exemplary embodiment of the present disclosure.

FIG. 3 is a drawing showing a learning method of a vehicle applying a sudden acceleration prevention method of a vehicle according to an exemplary embodiment of the present disclosure.

The vertical axis of FIG. 3 is a value obtained by converting the output values of the accelerator pedal sensor 24 and the brake pedal sensor 26 to the amount of pedal footing, and can be expressed in mm units for use in determining mis-operation (or incorrect operation).

The vertical axis of FIG. 3 represents the pedal operation slope of the accelerator pedal sensor 24 and the brake pedal sensor 26.

The graph on the upper left is a record of the driver's accelerator pedal operation. In a general operation situation, the pedal is pressed relatively slowly and the amount of manipulated is relatively small, and in case of sudden acceleration, the amount of manipulated is relatively fast and the amount of manipulated in the middle can be recorded.

The lower left graph is a record of the driver's brake pedal operation. In a general braking situation, the pedal can be stepped relatively slowly and a small amount of manipulation can be indicated, and in case of sudden braking, the pedal can be stepped relatively quickly and an intermediate manipulation amount can be recorded.

Specially manipulated or mis-operation estimates can be excluded from the data to ensure an average range.

The controller 10 determines the average accelerator pedal operation and brake pedal operation. For example, the controller 10 determines the data excluding the data (C, D) that has a low operation frequency or deviates from a predetermined range from the average range as the accelerator pedal operation range (E) and the brake pedal operation range (F).

The controller 10 combines the determined accelerator pedal operating range (E) and brake pedal operating range (F).

The graph on the right is a combination of the accelerator pedal operation range (E) and brake pedal operation range (F). The accelerator pedal operation range (E), the accelerator pedal/brake pedal overlap range (G), and the mis-operation detection range (H) are shown.

According to the output signal of the accelerator pedal sensor 24, the controller 10 applies the output signal to the right learning graph, and controls the vehicle's output according to the corresponding range.

For example, if the output signal of the accelerator pedal sensor 24 corresponds to the accelerator pedal operation range (E), it can be interpreted as a normal accelerator pedal operation. And the controller 10 can control the output of the output portion 50 according to the output signal of the accelerator pedal sensor 24.

Here, the output portion 50 may be, for example, an engine, an engine and a drive motor or a drive motor.

For example, if the output signal of the accelerator pedal sensor 24 falls within the accelerator pedal and brake pedal overlap range (G), this may be a normal accelerator pedal operation, or the driver intended to operate the brake pedal, but it could be a mis-operation of the accelerator pedal. Therefore, in this case, the controller 10 can control the output of the output portion 50 according to the current speed of the vehicle.

For example, if the output signal of the accelerator pedal sensor 24 falls within the mis-operation detection range (H), the driver was intended to operate the brake pedal, but could be interpreted as a mis-operation of the accelerator pedal. And thus, the controller 10 can limit the output of the output portion 50.

Figure 4:
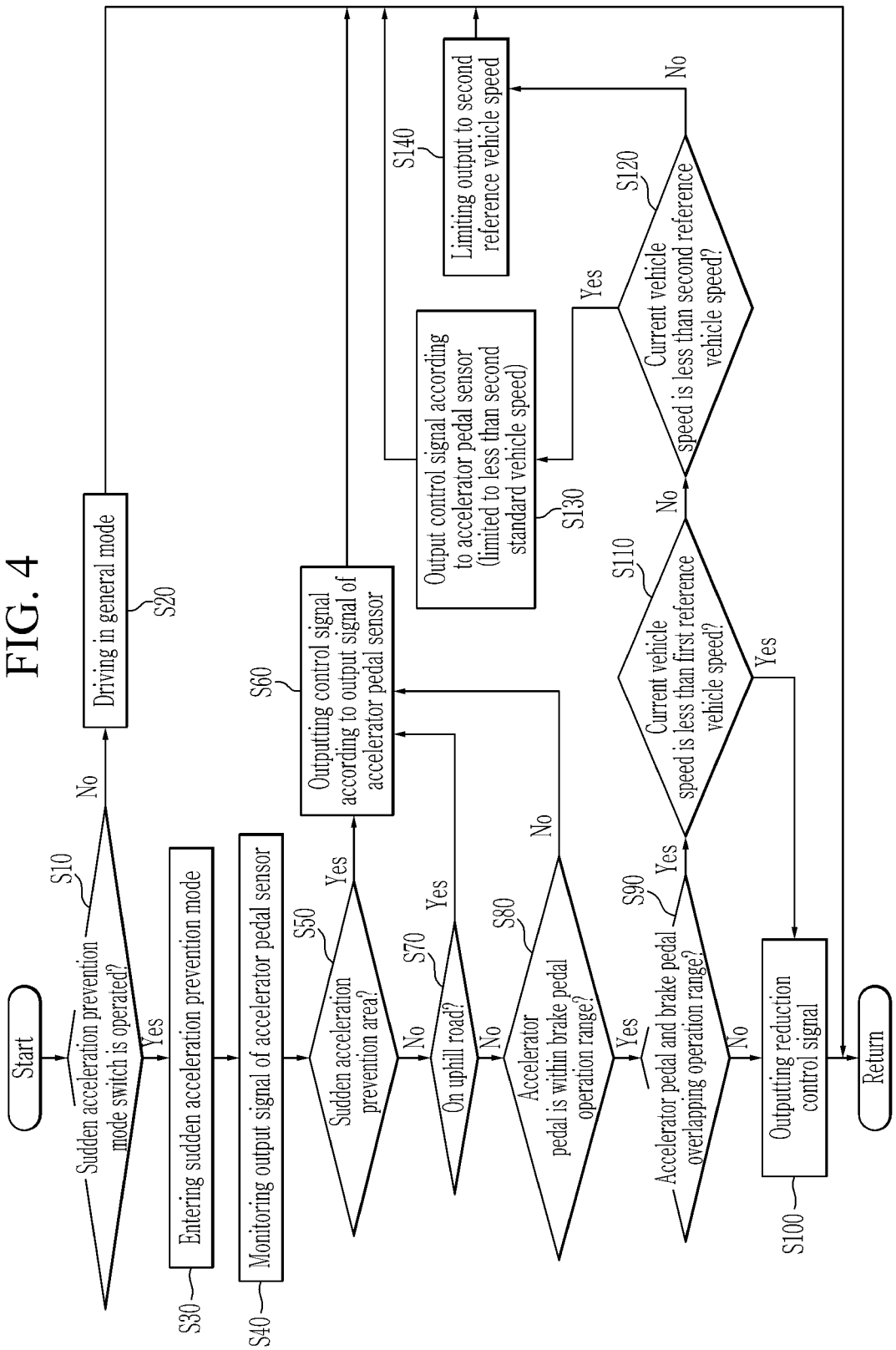
FIG. 4 is a flowchart showing a sudden acceleration prevention method of a vehicle according to an exemplary embodiment of the present disclosure.

FIG. 4 is a flowchart showing a sudden acceleration prevention method of a vehicle according to an exemplary embodiment of the present disclosure.

Hereinafter, referring to FIG. 4, the sudden acceleration prevention method of a vehicle according to an exemplary embodiment of the present disclosure will be described.

According to an exemplary embodiment of the present disclosure, the controller 10 monitors the output signal of an accelerator pedal sensor 24 (S40), and determines whether the detected operation state of the accelerator pedal is within the predetermined brake pedal operation range (F range) (S80). And then the controller 10 determines whether the detected operation state of the accelerator pedal is within the predetermined accelerator pedal and brake pedal overlapping operation range (G range) if the detected operation state of the accelerator pedal is within the predetermined brake pedal operation range (F range) (S90). And the controller 10 outputs an output reduction control signal of the vehicle if the detected operation state of the accelerator pedal is not within the accelerator pedal and brake pedal overlapping operation range (G range) (S100)

The brake pedal operation range (F range) includes the accelerator pedal and brake pedal overlapping operation range (G range) and the mis-operation detection range (H range). Therefore, when the detected operation state of the accelerator pedal is within the brake pedal operation range (F range) and not the accelerator pedal and brake pedal overlapping operation range (G range), It can be interpreted as meaning that the output signal of the accelerator pedal sensor 24 is within the mis-operation detection range (H range). That is, at this time, the driver intended to step on the brake pedal, but interpreted as stepping on the accelerator pedal, and the controller 10 limits the operation of the output portion 50. For example, the operation limit of the output portion 50 may be limited by the idle torque. The idle torque may be a value corresponding to the idle torque when the output portion 50 of the vehicle is an engine, and in the case that the output portion 50 is an operation motor or an operation motor and an engine, it may be a value corresponding to the idle torque.

The vehicle speed sensor 28 detects the current vehicle speed and outputs a corresponding signal and the controller 10 determines whether the current vehicle speed is less than a predetermined first reference vehicle speed if the detected accelerator pedal operation status is within the predetermined accelerator pedal and brake pedal overlapping operation range (G range) (S110). And the controller 10 outputs the output reduction control signal of the vehicle if the current vehicle speed is less than the first reference vehicle speed (S100). That is, in this case, the output of the engine and/or operation motor is limited by interpreting it as mis-operation of the driver at low speed. Here, a first standard vehicle speed, for example, may be 10 km/h, but is not limited thereto.

If the detected accelerator pedal operation status is within the predetermined accelerator pedal and brake pedal overlapping operation range (G range) and the current vehicle speed is not less than the first reference vehicle speed, the controller 10 determines whether the current vehicle speed is less than a predetermined second reference vehicle speed (S120). The controller 10 outputs an output control signal of the vehicle according to the output signal of the accelerator pedal sensor 24 if the current vehicle speed is less than the second reference vehicle speed (S130).

The vehicle's output may be limited to less than a second standard vehicle speed (S130).

That is, in this case, assuming that the vehicle is driving in the city, the output control signal of the vehicle is output according to the output signal of the accelerator pedal sensor 24, but the output control signal of the vehicle may be limited to less than the second standard vehicle speed. For example, the second reference vehicle speed may be limited to 60 km/h, but is not limited thereto.

The controller 10 may limit the output of the vehicle to the second reference vehicle speed if the current vehicle speed is not less than the second reference vehicle speed (S140). In this case, the output of the vehicle may be limited to the second standard vehicle speed to prevent speeding, and the second standard vehicle speed may be limited to, for example, 60 km/h, but is not limited thereto.

The predetermined brake pedal operation range (Grange and H range) and the predetermined accelerator pedal and brake pedal overlapping operation range (G range) may be experimentally determined and stored in advance in memory 40 (e.g., in a map). That is, the operation of the accelerator pedal and brake pedal of a general driver is predicted and the corresponding range is stored in the memory 40 in advance, and the sudden acceleration prevention method of the vehicle can be performed by applying it to the memory 40 during the accelerator pedal operation of the driver.

The predetermined brake pedal operation range (G range and H range) and the predetermined accelerator pedal and brake pedal overlapping operation range (G range) may be stored ranges by learning the operation of the accelerator pedal and brake pedal of the driver. That is, in step S40, it is possible to measure the operation of the vehicle accelerator pedal and brake pedal, store the range in the memory 40 in advance, and perform a sudden acceleration prevention method of the vehicle in consideration of the driving habit of the vehicle driver.

The predetermined brake pedal operation range (G range and H range) and the predetermined accelerator pedal and brake pedal overlapping operation range (G range) may be ranges stored according to the operation rate and operation depth of the accelerator pedal and brake pedal of the driver.

That is, as described above, by storing the operation speed of the accelerator pedal and the brake pedal and the amount of pedal depressed, and learning the driving habit of the driver of the individual vehicle, it is possible to determine whether or not the individual driver has malfunctioned.

The predetermined brake pedal operation range (G range and H range) and the predetermined accelerator pedal and brake pedal overlapping operation range (G range) may be ranges in which the frequency of use of the measured driver's accelerator pedal and brake pedal operation rate and operation depth is detected, and an operation state that is higher than a predetermined frequency of use is stored. That is, as described above, data excluding data (C, D) having a low operation frequency or deviating from a predetermined range from the average range may be determined as the accelerator pedal operation range (E range) and the brake pedal operation range (F range). In order to secure an average range, the sudden acceleration prevention method that considers the driving habits of individual drivers can be applied by excluding unusually manipulated or mis-operation estimates.

The controller 10 measures the position of the vehicle (S50), and if the current vehicle position falls within a predetermined sudden acceleration prevention area, the controller 102 outputs the vehicle's output control signal according to the output signal of the accelerator pedal sensor 24 (S60).

The sudden acceleration prevention area may include at least one of a highway or an uphill road.

The vehicle of which the sudden acceleration prevention method according to the exemplary embodiment of the present disclosure may further include the navigation system 30 that measures the vehicle's position and outputs the position, and if the current vehicle position corresponds to the predetermined sudden acceleration prevention area in advance, the controller 10 controls the operation of the output portion 50 according to the output signal of the accelerator pedal sensor 24.

For example, when merging onto a highway or on an uphill road, an accident can be prevented by pressing the accelerator pedal quickly. Therefore, the sudden acceleration prevention method of a vehicle according to an exemplary embodiment of the present disclosure may not perform torque reduction at high speed or on an uphill road.

The sudden acceleration prevention method of the vehicle according to an exemplary embodiment of the present disclosure further includes a step S10 of determining whether the sudden acceleration prevention mode switch is operated. And when the sudden acceleration prevention mode switch 22 is turned on, the controller 10 can enter the sudden acceleration prevention mode (S20). That is, when the driver determines whether the sudden acceleration prevention method is applied to the vehicle and intends that the sudden acceleration prevention method is not applied, the vehicle runs in a general mode (S20).

The vehicle may further include the gradient sensor 32 that measures a road slope and outputs a corresponding signal. And it is determined that the current driving road of the vehicle is an uphill road (S70), the controller 10 may output an output control signal of the vehicle according to the output signal of the accelerator pedal sensor 24.

Separate from the navigation system 30 described above, it is determined whether the current driving road is uphill through gradient sensor 32, which measures the slope of the vehicle. And on an uphill road, the vehicle can run in a normal mode, and thus the possibility of an accident due to the power limitation can be blocked (S20).

As described above, according to the sudden acceleration prevention method of the vehicle according to an exemplary embodiment of the present disclosure and the vehicle to which it is applied, the learning control logic is applied to the controller, and the idle torque control can be performed when the accelerator pedal is suddenly operated only when it is clearly determined that the pedal is malfunctioned.

In addition, it is possible to prevent sudden acceleration of the vehicle and secure the power performance of the vehicle when necessary.

On an uphill road or on a highway, it is possible to prevent vehicle accidents by controlling the output according to the amount of the accelerator pedal operation.

While this disclosure has been described in connection with what is presently considered to be practical exemplary embodiments, it is to be understood that the disclosure is not limited to the disclosed embodiments. On the contrary, it is intended to cover various modifications and equivalent arrangements included within the spirit and scope of the appended claims.

What is claimed is:

1. A sudden acceleration prevention method for a vehicle, comprising:
    monitoring, by a controller, an output signal of an accelerator pedal sensor so as to obtain a detected operation state of an accelerator pedal;
    determining, by the controller, whether the detected operation state of the accelerator pedal is within a predetermined brake pedal operation range;
    determining, by the controller, whether the detected operation state of the accelerator pedal is within a predetermined accelerator pedal and brake pedal overlapping operation range if the detected operation state of the accelerator pedal is within the predetermined brake pedal operation range; and
    outputting, by the controller, an output reduction control signal of the vehicle if the detected operation state of the accelerator pedal is not within the predetermined accelerator pedal and brake pedal overlapping operation range.

2. The sudden acceleration prevention method of claim 1, further comprising:
    detecting a current vehicle speed and outputting a corresponding signal by a vehicle speed sensor and determining, by the controller, whether the current vehicle speed is less than a predetermined first reference vehicle speed if the detected accelerator pedal operation status is within the predetermined accelerator pedal and brake pedal overlapping operation range; and
    outputting, by the controller, the output reduction control signal of the vehicle if the current vehicle speed is less than the first reference vehicle speed.

3. The sudden acceleration prevention method of claim 2, further comprising:
    determining, by the controller, whether the current vehicle speed is less than a predetermined second reference vehicle speed if the current vehicle speed is not less than the first reference vehicle speed; and outputting, the controller, an output control signal of the vehicle according to the output signal of the accelerator pedal sensor if the current vehicle speed is less than the second reference vehicle speed.

4. The sudden acceleration prevention method of claim 3, wherein the output of the vehicle is limited to less than a second standard vehicle speed.

5. The sudden acceleration prevention method of claim 3, wherein the controller limits the output of the vehicle to the second reference vehicle speed if the current vehicle speed is not less than the second reference vehicle speed.

6. The sudden acceleration prevention method of claim 1, wherein the predetermined brake pedal operation range and the predetermined accelerator pedal and brake pedal overlapping operation range are stored in in advance in memory.

7. The sudden acceleration prevention method of claim 1, wherein the predetermined brake pedal operation range and the predetermined accelerator pedal and brake pedal overlapping operation range are obtained by learning in advance a driver's operation of the accelerator pedal and a brake pedal.

8. The sudden acceleration prevention method of claim 7, wherein the predetermined brake pedal operation range and the predetermined accelerator pedal and brake pedal overlapping operation range are stored ranges according to an operation rate and an operation depth of the accelerator pedal and brake pedal by a driver.

9. The sudden acceleration prevention method of claim 8, wherein the predetermined brake pedal operation range and the predetermined accelerator pedal and brake pedal overlapping operation range correspond to a frequency of use of the accelerator pedal and the brake pedal, and store the operation state above the predetermined frequency of use.

10. The sudden acceleration prevention method of claim 1, further comprising: measuring a position of the vehicle; wherein if the position of the vehicle falls within a predetermined sudden acceleration prevention area, the controller outputs an output control signal of the vehicle according to the output signal of the accelerator pedal sensor.

11. The sudden acceleration prevention method of claim 10, wherein the sudden acceleration prevention area includes at least one of a highway or an uphill road.

12. The sudden acceleration prevention method of claim 1, further comprising:
determining whether the sudden acceleration prevention mode switch is operated;
wherein if the sudden acceleration prevention mode switch is on, the operation to prevent sudden acceleration of the vehicle is performed.

13. The sudden acceleration prevention method of claim 1, further comprising: measuring a road slope;
wherein if the current vehicle's driving road is uphill, the controller outputs the vehicle's output control signal according to the output signal of the accelerator pedal sensor.

14. The sudden acceleration prevention method of claim 1, further comprising:
outputting, by the controller, an output control signal of the vehicle according to the output signal of the accelerator pedal sensor when the detected operation state of the accelerator pedal is not within the brake pedal operation range.

15. A vehicle to which an acceleration prevention method is applied, the vehicle comprising:
a vehicle operating condition measuring unit including an accelerator pedal sensor, a brake pedal sensor, and a vehicle speed sensor;
an output portion that drives the vehicle; and
a controller that controls operation of the output portion according to an output signal of the vehicle operating condition measuring unit so as to obtain a detected operation state of an accelerator pedal,
wherein the accelerator pedal sensor detects the operation of the accelerator pedal and outputs the corresponding signal,
the controller determines whether the detected accelerator pedal operation state is within a predetermined brake pedal operation range,
if the detected accelerator pedal operation state is within the predetermined brake pedal operation range, the controller determines whether the detected accelerator pedal operation state is within a predetermined accelerator pedal and brake pedal overlapping operation range,
if the detected accelerator pedal operation state is not within the predetermined accelerator pedal and brake pedal overlapping operation range, the controller outputs a vehicle's output reduction control signal to limit the operation of the output portion, and
if the detected accelerator pedal operation status is not within the brake pedal operation range, the controller controls the operation of the output portion according to the output signal of the accelerator pedal sensor.

16. The vehicle of claim 15, wherein:
if the detected accelerator pedal operation state is within the predetermined accelerator pedal and brake pedal overlapping operation range, the controller determines whether a current vehicle speed is less than a predetermined first reference vehicle speed;
if the current vehicle speed is less than the first reference vehicle speed, the controller outputs a control signal for reducing the output of the vehicle to limit the operation of the output portion;
if the current vehicle speed is not less than the first reference vehicle speed, the controller determines whether the current vehicle speed is less than a predetermined second reference vehicle speed, and if the current vehicle speed is less than the second reference vehicle speed, the controller controls the operation of the output portion according to the output signal of the accelerator pedal sensor; and
if the current vehicle speed is not less than the second reference vehicle speed, the controller controls the operation of the output portion to limit the vehicle speed to the second reference vehicle speed.

17. The vehicle of claim 15, wherein the predetermined brake pedal operation range and the predetermined accelerator pedal and brake pedal overlapping operation range are stored ranges according to an operation rate and an operation depth of the accelerator pedal and a brake pedal by a driver.

18. The vehicle of claim 17, wherein the predetermined brake pedal operation range and the predetermined accelerator pedal and brake pedal overlapping operation range correspond to a frequency of use of the accelerator pedal and the brake pedal, and store the operation state above the predetermined frequency of use.

19. The vehicle of claim 15, further comprising:
a navigation system that measures a position of the vehicle and outputs the position;
wherein if the current vehicle position corresponds to a predetermined sudden acceleration prevention area in advance, the controller controls the operation of the output portion according to the output signal of the accelerator pedal sensor.

20. The vehicle of claim 19, the sudden acceleration prevention area comprises at least one of a highway and an uphill road.

* * * * *